Jan. 21, 1964  R. L. GOLD ETAL  3,118,708
RETARDER VALVE
Original Filed Nov. 29, 1960  2 Sheets-Sheet 1

INVENTORS
ROBERT L. GOLD
STEVE SCHNELL
BY Gravely, Lieder & Woodruff
ATTORNEYS

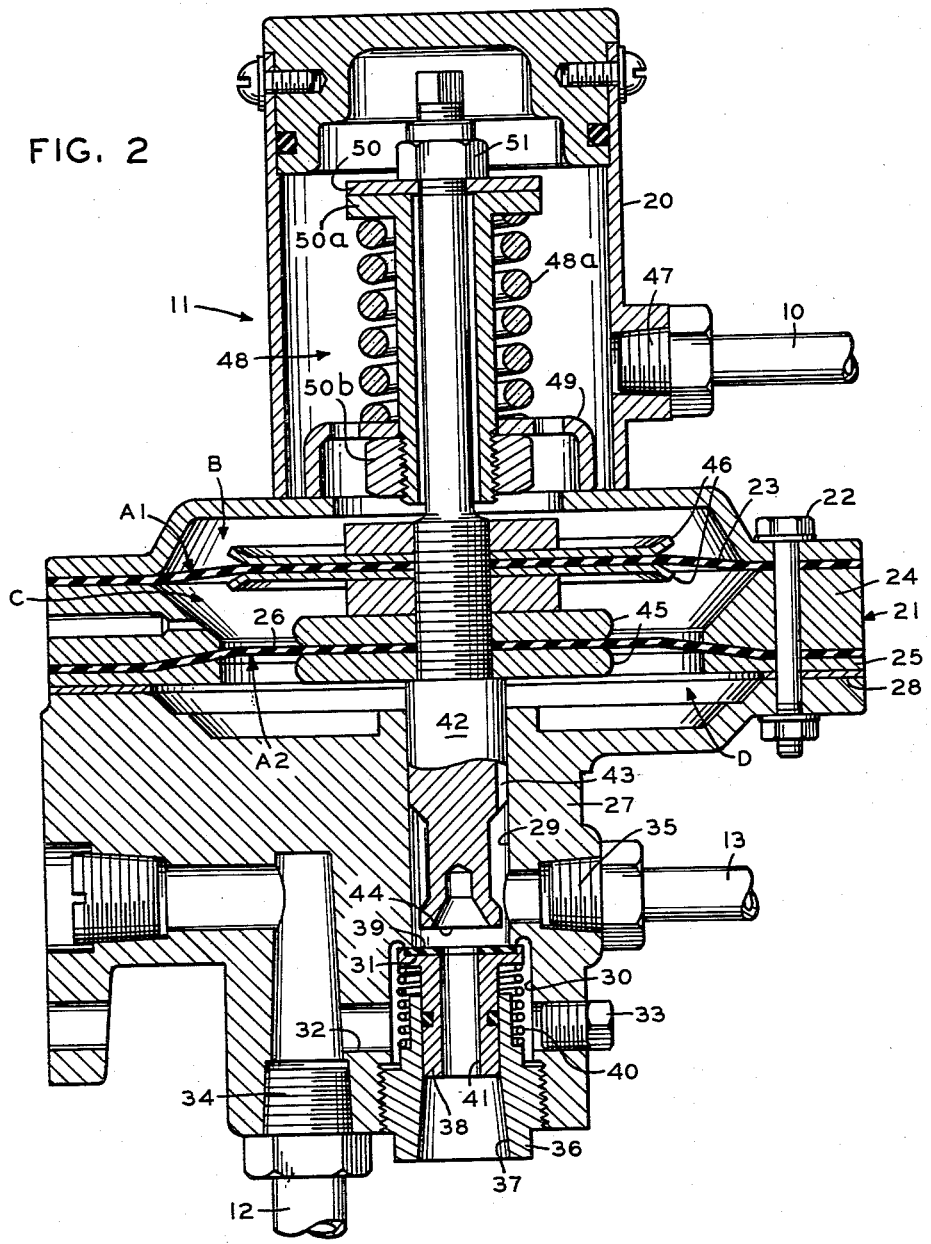

3,118,708
RETARDER VALVE
Robert L. Gold, Pine Lawn, and Steve Schnell, Edmundson, Mo., assignors to Wagner Electric Corporation, St. Louis, Mo., a corporation of Delaware
Original application Nov. 29, 1960, Ser. No. 72,400. Divided and this application May 16, 1962, Ser. No. 195,107
8 Claims. (Cl. 303—40)

This invention relates generally to fluid pressure systems and more particularly to a brake system having both retarding and service brakes and control means therefor.

In the past, brake systems for trucks and similar heavy duty vehicles were provided with service brakes and retarding brakes, each of which were adapted to be energized in response to the actuation of separate control means therefor, such as application valves. The term "service brakes" refers to conventional brakes which are employed on a vehicle for inertia stopping applications, and the term "retarding brakes" refers to brakes which are employed on a vehicle for retarding or snubbing purposes such as to prevent the vehicle from exceeding a desired speed as on a downhill grade.

An object of the present invention is to provide an improved brake system including both service and retarding brakes and adapted to be operated in response to a singular control or actuation device.

Another object of the present invention is to provide a novel brake system in which the retarding brakes are selectively energized prior to energization of the service brakes.

Still another object of the present invention is to provide a brake system having a retarder valve responsive to fluid pressure applied to the retarding brakes above a predetermined amount to meter pressure fluid to the service brakes.

Briefly, the present invention is embodied in a fluid pressure system having first and second frictional devices, and control means for operating one of said frictional devices in response to predetermined fluid pressure conditions therein. The invention more specifically is embodied in a retarder valve responsive to fluid pressures in vehicle retarding brakes for establishing communication to vehicle service brakes when the applied fluid pressure exceeds a predetermined value. The invention further consists in the parts and in the arrangements and combinations of parts hereinafter described and claimed.

Figure 1:
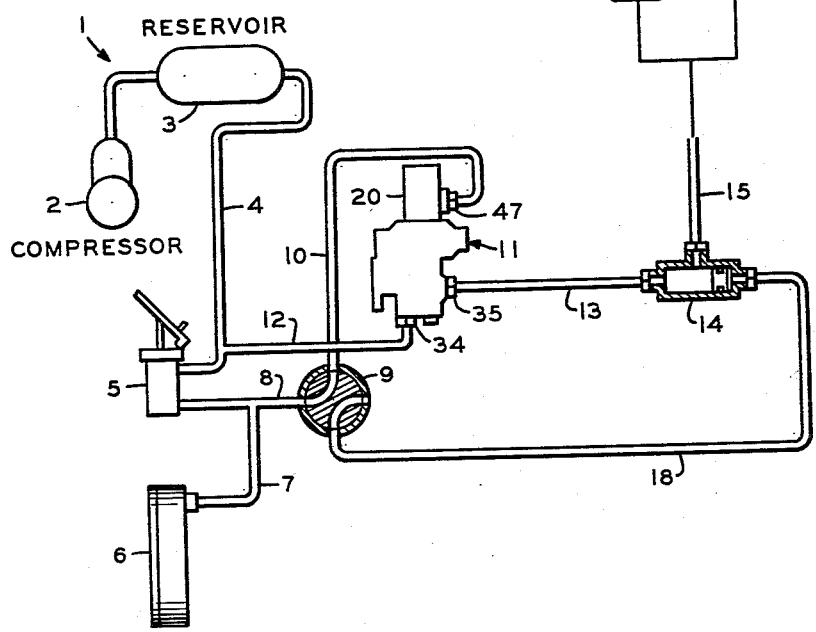
Figure 3:
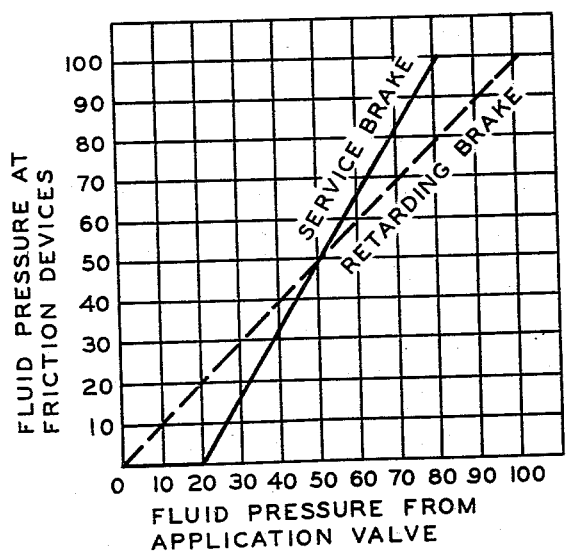

In the accompanying drawings which form a part of this specification and in which like numerals refer to like parts wherever they occur:

FIG. 1 is a diagrammatic view of a fluid pressure system embodying the teachings of the present invention, FIG. 2 is a vertical cross-sectional view of a novel retarder valve in the system, and FIG. 3 is a graphic illustration of representative fluid pressures at the frictional devices of the system during actuation thereof.

This is a division of co-pending application No. 72,400, filed November 29, 1960, for Retarder Valve and Brake System.

Referring now to FIG. 1 of the drawings, the brake system 1 is provided fith pressure generating means, such as a compressor 2, which is connected through a reservoir 3 by a conduit 4 to the inlet side of actuation means, such as an application valve 5. The outlet side of the application valve 5 is connected with the actuating port of a friction device or retarding brake mechanism 6 by a conduit 7, and a branch conduit 8 connects the outlet of the application valve with a two-way hand valve 9. In the retarding position, the two-way hand valve 9 normally provides communication between the branch conduit 8 and a conduit 10 connected with the actuation or control port 47 of a control or retarder valve 11. Another conduit 12 is connected between the conduit 4 to the reservoir 3 and the inlet port 34 of the retarder valve 11, and the outlet port 35 of the retarder valve is connected by a conduit 13 to one of the inlets of a two-way check valve 14. A conduit 15 has one end connected with the outlet of the two-way check valve 14 while the other end thereof branches to connect with slave cylinder means, such as power cylinders 16, operatively connected with slack adjusting means 17 of separate friction devices or service brake assemblies (not shown). The other inlet of the two-way check valve 14 is connected by a conduit 18 to the two-way hand valve 9 and is normally vented to atmosphere when the two-way hand valve is in the retarding position as shown.

Referring now to FIG. 2, the retarder valve 11 comprises an upper housing 20 rigidly secured to an intermediate housing 21 by studs 22 or the like, and a first resilient member or diaphragm 23 having a predetermined pressure responsive area $A_1$ is positioned between the housing 20 and 21 forming an actuation or control chamber B with the upper housing 20. The intermediate housing includes upper and lower portions 24 and 25 between which is sealably secured a second resilient member or diaphragm 26 having a predetermined effective or pressure responsive surface area $A_2$ smaller than the area $A_1$ of the diaphragm 23. A lower housing 27 is rigidly secured to the lower portion 25 of the intermediate housing 21 by the studs 22 with a suitable seal or gasket 28 therebetween. An intermediate chamber C between the diaphragms 23 and 26 is vented to atmosphere and a reaction chamber D is formed in the lower housing 27 by the diaphragm 26.

The lower housing 27 is provided with a bore 29 coaxially aligned with a counterbore 30 and with the diaphragm chamber D, an anular valve seat 31 being formed on the shoulder between the bore 29 and counterbore 30. The counterbore 30 is intersected by a cross-passage 32 one end of which is closed by a plug 33 and the other end being connected with the inlet port 34 to which the conduit 12 from the reservoir 3 is connected. The outlet port 35 intersects the bore 29 and is connected by the conduit 13 to the service brake assemblies through the check valve 14. A valve guide member 36 is threadedly received in the lower end of the counterbore 30 and has a bore 37 in which an inlet control valve 38 is slidably positioned. The inlet valve 38 carries a seal 39 and is normally biased into sealable engagement with the cooperating valve seat 31 by a spring 40 of negligible force. The valve 38 is provided with an axial passage 41 forming an exhaust passage normally in communication with the bore 29 and outlet port 34.

A valve stem 42 is slidably received in the bore 29 and is provided with a metering passage 43 or like clearance to connect the chamber D with the bore whereby the chamber D is normally exhausted to atmosphere through passage 41. The lower end of the stem is normally spaced from the inlet valve 38 and has an annular seat 44 adapted for lost motion sealing engagement with the inlet valve about the exhaust passage 41. The mid-portion of the valve stem 42 is threaded and has pairs of plate members 45 and 46 secured thereto between which the diaphragms 23 and 26, respectively, are mounted.

The upper housing 20 is provided with the actuating port 47 to which the conduit 10 is connected. A pre-loaded or pre-compressed spring assembly 48 is provided with a spring 48a compressed between an abutment member 49 secured to the upper housing and an upper abutment member 50. The upper abutment member 50 is provided with an integral sleeve 50a which extends through the lower abutment member 49, and a retaining nut 50b, threadedly received on the lower end of the sleeve, is normally biased into abutment with the lower abutment member 49 by the compressive force of the spring 48a. The stem 42 extends through the sleeve 50a and threadedly receives an adjusting nut 51 on the upper end thereof, the adjusting nut being normally positioned in abutment with the upper abutment member 50 by the weight of the stem 42 and parts associated therewith. Accordingly, the pre-compressed spring assembly 48 does not normally exert a force on the stem 42, and the threaded engagement between the stem and the adjusting nut 51 serves as an adjustment means for adjusting the distance of travel between the lower end of the stem and the valve seal 39.

In fluid pressure systems for heavy duty vehicles, such a highway trucks, the principal problem in the past has been heat which results in brake fading due to hard or sustained braking applications as when such heavy equipment operates at high speeds or on relatively long downhill grades. Where it is desired to prevent run away or hold a desired speed of the vehicle, even light brake actuation producing retarding or drag conditions has resulted in a high degree of heat and in abrasion and wear of friction materials as an incident of such heat. It has been discovered that such heat can be dissipated by utilizing fluid cooled disc brakes or the like on predetermined axles of the vehicle as the retarding brake devices 6. However, for normal inertia stops, emergency inertia stops and snubbing in traffic, the usual service brake members actuated by power cylinders 16 are provided and the retarding brakes 6 are also operable with the service brakes according to the present invention.

Under normal operating conditions of the system 1 and control valve 11 (with the valve 9 being connected as shown in FIG. 1), an operator applied force to the application valve 5 meters pressure fluid from the reservoir 3 through the conduit 7 to establish a fluid pressure to energize the retarding brakes 6. The pressure fluid also flows through the branch conduit 8, valve 9, conduit 10 and actuation port 47 of the control valve 11 into the chamber B in the upper housing 20 to establish a fluid pressure ($P_1$) equal to that applied in the retarding brakes 6. The pressure $P_1$ acts on the effective area $A_1$ of the diaphragm 23 to create an input or downward force in opposition to the pre-compressed spring force ($F$) of the assembly spring 48. If the downward force exerted on the stem 42 by pressure $P_1$ acting on the area $A_1$ is less than the compressive force F of the spring assembly 48, movement of the valve stem 42 is prevented and the inlet control valve 38 remains seated to prevent actuation of the service brakes.

When the fluid pressure $P_1$ acting on the diaphragm area $A_1$ is increased to provide a downward force to overcome the force F of the spring assembly 48, the stem 42 is moved downwardly into engagement with the inlet valve seal 39 to initially close the exhaust passage 38, and further downward movement of said stem unseats the inlet valve 38 allowing pressure fluid flow directly from the reservoir 3 through conduits 4 and 12, inlet port 34 and around the valve 38 in the valve chamber formed by the counterbore 30 and bore 29 to the conduits 13 and 15 into the power cylinders 16 to actuate the slock adjusting mechanisms 17 which energize the service brakes (not shown). Pressure fluid also flows in the bore 29 through the passage 43 to establish the fluid pressure ($P_2$) in the chamber D which acts on the effective area $A_2$ of the diaphragm 26 to create the reaction or upward force additive to the spring force F in opposition to the input force $P_1A_1$. Since the effective area $A_1$ of the diaphragm 23 is greater than the area $A_2$ of the diaphragm 26, a greater fluid pressure $P_2$ is established on the smaller effective area of the diaphragm 26 to provide a reaction force which, when added to the compressive force of the spring 48, is equal to the input force. As a result, the fluid pressure $P_2$ developed in the chamber D and in the service brakes increases in a ratio to the fluid pressure $P_1$ in the chamber B and retarding brakes 6, that is proportional with the ratio of the areas $A_1$ to $A_2$. In other words, the value of $P_2$, during a braking application of an intensity effecting the actuation of the retarding valve 11 may be determined by the formula:

$$P_2 = \frac{A_1 P_1 - F}{A_2}$$

However, it is apparent that when the spring force F has been overcome by the input force, an increase in fluid pressure $P_1$ in the chamber B must be balanced by a greater value of fluid pressure $P_2$ so that fluid pressure to the service brakes increases at a greater rate than fluid pressure metered to the retarding brakes whereby the service brakes assume the greater braking load for more intense brake applications.

Referring now to FIG. 3 wherein a representative brake application is shown graphically, it will be noted that fluid pressures in both the retarding and service brakes increase linearly with increases in the pressure fluid metered through the application valve 5. The retarding brake 6 is actuated directly from the application valve 5 and is operable by itself up to approximately 20 p.s.i. to establish drag conditions for retarding the vehicle. A further increase in pressure fluid metered to the retarding brakes 6 and actuation chamber B of the control valve 11 meters pressure fluid to the service brake line 13. The range of braking pressures for producing inertia stops and snubbing may be approximately between 20 p.s.i. and 60 p.s.i., and emergency inertia stops may be produced by pressures from 60 p.s.i. to 100 p.s.i. It will be noted that each service brake assumes a greater braking load than each retarding brake beginning when the fluid pressure is about 50 p.s.i.

When the reaction force $P_2A_2$ in the chamber D of the control valve 11 plus the compressive force of the spring assembly 48 becomes equal to the input force $P_1A_1$, the diaphragm 23 and 26 move the stem 42 to a lapped or poised position with the inlet valve 38, and the inlet valve is also moved into a lapped or poised position with the seat 31. In this position, pressure fluid communication is interrupted between the inlet and outlet ports 34 and 35 and between the outlet port 35 and exhaust passage 41. If a greater braking effort is desired, the applied force on the application valve 5 is increased which effects an increase in the fluid pressure $P_1$ delivered to the retarding valve 11 and retarding brake 6, and said retarding valve is again actuated to increase the fluid pressure $P_2$ delivered to energize the service brakes, as previously described. When the applied force is removed from the application valve 5, the pressure fluid is exhausted from the retarding brake 6 and upper housing 20 of the retarder valve 11 through the application valve 5, and the compressive force of the spring assembly 48 and the reaction force move the diaphragms 23 and 26 and stem 42 to inoperative position which allows the inlet valve 38 to engage its seat 31 and open the exhaust passage 41 to exhaust the pressure fluid from the power cylinders 16 and release the service brakes.

The two-way hand valve 9 may be manually rotated 90° to connect the conduits 8 and 18 and also establish communication between the conduit 10 and the exhaust port of the valve 9. Accordingly, under such conditions it is apparent that both the retarding and service brakes are simultaneously energized in response to actuation of the application valve 5, and that the upper housing 20 of the retarder valve 11 is vented to atmosphere.

It is now apparent that a novel fluid pressure system has been provided in which the application of some friction devices may be retarded relative to the application of other friction devices and in which the control means is responsive to actuation pressures of the latter friction devices. It is also apparent that the ratio of the pressure responsive areas $A_1$ and $A_2$ of control means 11 or the like may be varied to provide different fluid pressure curves for the retarding and service brakes.

The invention includes all changes and modifications of the foregoing disclosure which will be readily apparent to those skilled in the art, and the invention is to be limited only by the claims which follow.

What we claim is:

1. A control valve for a fluid pressure system comprising a housing having inlet, outlet, exhaust and control ports therein, valve means controlling pressure fluid communication between said inlet, outlet and exhaust ports, valve operating means in said housing for operative engagement with said valve means and having opposed faces respectively responsive to fluid pressure at said control and outlet ports, said valve operating means being movable in response to fluid pressure at said control port acting on one of said opposed faces into engagement with said valve means interrupting pressure fluid communication between said outlet and exhaust ports and establishing pressure fluid communication between said inlet and outlet ports, a stem connected with said valve operating means, and a precompressed spring assembly including a sleeve member engaged with said stem and having opposed flanges thereon, precompressed spring means contained between said housing and one of said flanges and normally urging the other of said flanges into engagement with said housing, the precompressive force of said spring means serving to obviate movement of said valve operating means until the fluid pressure at said control port and acting on said one face of said valve operating means creates a force great enough to overcome the precompressive force of said spring means.

2. A control valve for a fluid pressure system comprising inlet, outlet and control chambers connected with a supply source of fluid pressure, a fluid pressure responsive device and a control source of fluid pressure, respectively, a first valve seat in said inlet chamber and having a passage formed therethrough between said inlet and outlet chambers, valve means disposed entirely within said inlet chamber and normally engaged with said first valve seat to interrupt pressure fluid communication between said inlet and outlet chambers, exhaust passage means in said valve means normally venting said outlet chamber to atmosphere, valve operating means in said housing between said control and outlet chambers and having opposed faces responsive to fluid pressure in said control and outlet chambers, stem means connected with said valve operating means and having opposed free end portions in said control and outlet chambers, respectively, a second valve seat on the free end portion of said stem means in said outlet chamber, said valve operating means being movable in response to fluid pressure acting on the opposed face thereof in said control chamber to initially move said stem means and engage said second valve seat with said valve means closing said exhaust passage means and interrupting communication between said outlet chamber and the atmosphere and subsequently disengaging said valve means from said first valve seat to establish pressure fluid communication between said inlet and outlet chambers, and a retained pre-compressed spring interposed between said housing and the free end portion of said stem means in said control chamber to prevent movement of said valve control means until the fluid pressure acting on the opposed face thereof in said control chamber establishes a force having a magnitude great enough to overcome that of the pre-compressive force of said precompressed spring, the opposed face of said valve operating means in said outlet chamber being responsive to the established fluid pressure in said outlet chamber to oppose further movement of said valve operating means and stem means.

3. A retarding valve for a fluid pressure system comprising a housing having inlet, reaction and control chambers, inlet, outlet and control ports connecting with said inlet, reaction and control chambers, respectively, a valve seat between said inlet and reaction chambers, a valve member slidable in said inlet chamber and normally biased into engagement with said valve seat closing communication between said inlet and reaction chambers, an exhaust passage in said valve member normally communicating said reaction chamber with the atmosphere, valve operating means including a valve stem having opposed ends, one of said ends extending into said reaction chamber and the other of said ends extending into said control chamber, spaced first and second diaphragm means sealably interposed between said valve stem and housing, said first diaphragm being responsive to fluid pressure in said control chamber to move said valve stem and engage said one valve stem end with said valve member to initially close said exhaust passage interrupting communication between said reaction chamber and the atmosphere and subsequently disengage said valve member from said valve seat opening communication between said inlet and reaction chamber, said second diaphragm means being responsive to the established fluid pressure in said reaction chamber to oppose further movement of said valve stem, and a pre-compressed spring assembly in said control chamber including a spring retainer connected with said other valve stem end, precompressed spring means contained between said housing and spring retainer and normally urging said spring retainer into abutment with said housing, the precompressive force of said precompressed spring means serving to obviate movement of said valve stem until the fluid pressure in said control chamber acting on said first diaphragm creates a force having a magnitude great enough to overcome that of the pre-compressive force of said precompressed spring means.

4. A control valve for a pressure fluid system comprising a housing having an aligned inlet, outlet, reaction and control chambers, inlet, outlet and control ports in said inlet, outlet and control chambers, respectively, a first valve seat between said inlet and outlet chambers, a valve bore connecting with said inlet chamber, a valve member including a sleeve portion slidable in said bore and a sealing head normally biased into engagement with said first valve seat to interrupt pressure fluid communication between said inlet and outlet ports, an exhaust passage in said valve member normally venting said outlet chamber to atmosphere, valve operating means including a valve stem extending between said control, reaction and outlet chambers and having opposed free ends, one of said opposed free ends being positioned in said control chamber and the other of said opposed free ends being normally positioned in said outlet chamber, a second valve seat on the other opposed free end and normally juxtaposed with said valve member sealing head, the cross-sectional areas of said second valve seat and said sealing member sleeve portion being substantially equal, passage means in said stem connecting said outlet and reaction chambers, spaced first and second diaphragm means sealably interposed between said valve stem and housing and between said control and reaction chambers, said first diaphragm means having a pressure responsive area responsive to fluid pressure at said control port to move said valve stem and engage said second valve seat with said valve member sealing head to initially close said exhaust passage interrupting communication between said outlet chamber and the atmosphere and subsequently disengaging said valve member sealing head from said first valve seat establishing pressure fluid communication between said inlet and outlet ports, said second diaphragm means having a pressure responsive area less than that of said first diaphragm means and responsive to fluid pressure in said reaction chamber to oppose movement of said valve stem, and a retained pre-compressed spring assembly in said control chamber interposed between said one opposed free end of said valve stem and said housing to obviate movement of said valve stem until the fluid pressure in said control port acting on the pressure responsive area of said first diaphragm means creates a force great enough to overcome the pre-compressive force of said spring assembly.

5. A control valve for fluid pressure comprising a housing having inlet, outlet, exhaust and control ports therein, valve means controlling pressure fluid communication between said inlet, outlet and exhaust ports, a valve control member for operative engagement with said valve means and having opposed faces respectively responsive to fluid pressure at said control and outlet ports, an abutment member secured to said housing and having an opening therein, a sleeve member extending through said opening and having spaced flanges thereon, a bore in said sleeve member, precompressed spring means contained between said abutment member and one of said flanges normally urging the other of said flanges into abutting engagement with said abutment member, extension means on said valve control means and having a free end extending from one of the valve control member faces through said sleeve member bore, and connecting means on the free end of said extension means and engaged with said one flange, the compressive force of said precompressed spring serving to obviate movement of said sleeve member, extension means and valve control member until the fluid pressure at said control port acting on said one valve control member face attains a value in excess of a predetermined amount to establish a control force having a magnitude great enough to overcome the precompressive force of said precompressed spring, said sleeve member, extension means and valve control member being thereafter movable against said precompressed spring in response to the control force to engage said valve control member with said valve means and move said valve means to a position interrupting pressure fluid communication between said outlet and exhaust ports and establishing fluid pressure communication between said inlet and outlet ports.

6. A control valve for a fluid pressure system comprising a housing having inlet, outlet and exhaust ports therein, valve means normally interrupting pressure fluid communication between said inlet and outlet ports and establishing pressure fluid communication between said outlet and exhaust ports, a control chamber in said housing having a control port connected therewith, valve operating means in said housing for operative engagement with said valve means and having opposed faces respectively responsive to fluid pressure in said control chamber and at said outlet port, a stem on said valve operating means extending into said control chamber, said valve operating means being movable in response to fluid pressure in said control chamber into engagement with said valve means to interrupt pressure fluid communication between said outlet and exhaust ports and thereafter move said valve means to a position establishing pressure fluid communication between said inlet and outlet ports, and retained precompressed resilient means in said control chamber engaged between said stem and housing to prevent movement of said valve operating means until the fluid pressure at said control port and acting on the face of said valve operating means in said control chamber creates a force great enough to overcome the precompressive force of said resilient means.

7. A control valve for a fluid pressure system comprising a housing having inlet, outlet and control chambers therein, inlet, outlet and control ports in said inlet, outlet and control chambers, respectively, a first valve seat in said inlet chamber and having a passage formed therethrough connecting said inlet and outlet chambers, valve means normally urged into engagement with said first valve seat to interrupt pressure fluid communication between said inlet and outlet ports, exhaust passage means in said valve means normally venting said outlet port to atmosphere, valve operating means in said housing between said control and outlet chambers and having opposed faces respectively responsive to fluid pressure at said control and outlet ports, a stem connected with said valve operating means and having opposed end portions, one of said end portions extending into said control chamber and the other of said end portions extending into said passage, a second valve seat on said other end portion normally juxtaposed with said valve means, said valve operating means being initially movable in response to fluid pressure at said control port acting on the opposed face thereof in said control chamber to move said stem to a position sealably engaging said second valve seat with said valve means to close said exhaust passage means and interrupt communication between said outlet port and the atmosphere, and said valve operating means being further movable to disengage said valve means from said first valve seat to establish fluid pressure communication between said inlet and outlet ports, and a retained precompressed spring assembly connected between said one end portion of said stem and said housing to obviate movement of said valve operating means until the fluid pressure at said control port and acting on the opposed face of said valve operating means in said control chamber establishes a force great enough to overcome the precompressed spring assembly.

8. A control valve for a fluid pressure system comprising a housing having inlet, outlet and control chambers connected with a supply source of fluid pressure, a fluid pressure responsive device and a control source of fluid pressure, respectively, passage means connecting said inlet and outlet chambers, valve means normally closing said passage means to interrupt pressure fluid communication between said inlet and outlet chambers, exhaust passage means in said valve means normally venting said outlet chamber to atmosphere, valve operating means in said housing between said control and outlet chambers including stem means having opposed free end portions in said control and outlet chambers, said valve operating means being responsive to fluid pressure in said control chamber to move said stem means and engage one of the free end portions thereof with said valve means to initially close said exhaust passage means interrupting communication between said outlet chamber and the atmosphere and subsequently move said valve means to a position opening said passage means and establishing fluid pressure communication between said inlet and outlet chambers, and retained precompressed yieldable means in said control chamber and connected between the other of said free end portions of said stem means and said housing to prevent movement of said valve control means until the fluid pressure in said control chamber and acting on said valve operating means attains a force in excess of a predetermined amount great enough to overcome the precompressive force of said precompressed yieldable means.

References Cited in the file of this patent

UNITED STATES PATENTS

| | | |
|---|---|---|
| 2,714,534 | Keller | Aug. 2, 1955 |
| 2,858,840 | Wright | Nov. 4, 1958 |
| 2,985,490 | Gates | May 23, 1961 |
| 3,018,136 | Williams | Jan. 23, 1962 |